May 15, 1945.   H. T. LAMBERT   2,375,854
HEAVY DUTY DISK BRAKE
Filed March 31, 1943   2 Sheets-Sheet 1

INVENTOR.
H. T. Lambert
BY Robb & Robb
Attorneys.

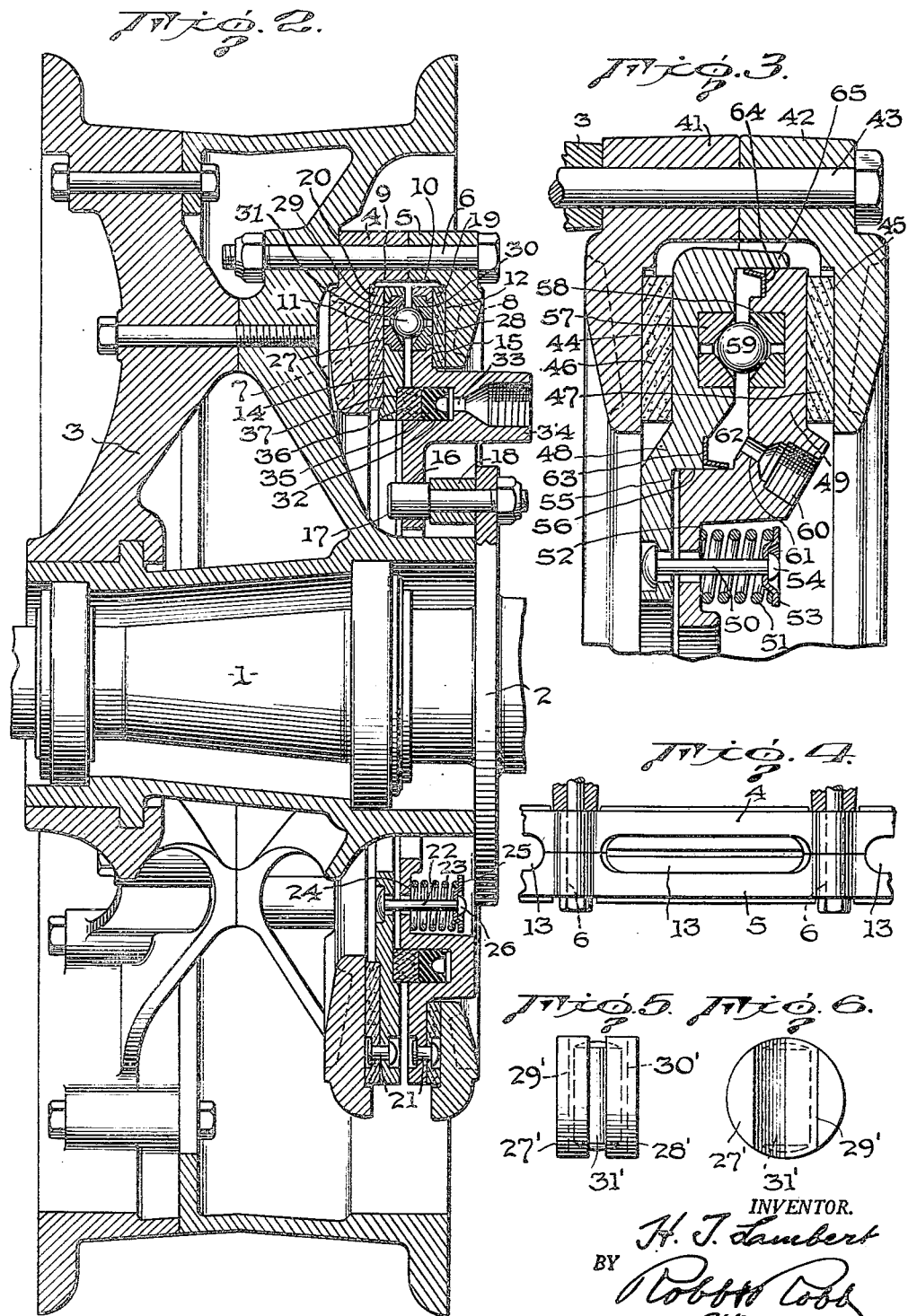

Patented May 15, 1945

2,375,854

UNITED STATES PATENT OFFICE 2,375,854

HEAVY-DUTY DISK BRAKE

Homer T. Lambert, St. Joseph, Mich., assignor to Lambert Brake Corporation, St. Joseph, Mich., a corporation of Michigan Application March 31, 1943, Serial No. 481,325

5 Claims. (Cl. 188—72)

This invention relates to brake mechanisms, and more especially, to disk brakes for use upon heavy automotive equipment, such as tractors, trucks, and other industrial equipment, airplanes, and for other general applications where the braking service is severe.

Heretofore, no completely satisfactory brake has been developed for heavy duty braking action, and this is particularly true of brakes which must operate to decelerate or stop relatively high speed rotating parts. The present invention, on the other hand, has for its primary object the provision of an efficient brake to fill the needs of heavy equipment users, and maintain efficient service and long life when used with such equipment which may vary from relatively low to relatively high speeds.

In attaining the aforementioned object, I have availed of the virtues of disk brakes to obtain the greater braking surfaces which are characteristic of these brakes, as distinguished from the smaller braking surfaces of drum brakes. My improvements primarily reside in the provision of a pair of opposed rotary brake members which may be made of two equal and complementary halves from the same mold in the case of cast brake parts, or from the same die in the case of pressed steel parts. These rotary brake members are suitably mounted upon the wheel, shaft, or other rotary part to be braked. Associated with the rotary brake members and located therebetween are two stator plates or disks having camming members positioned between the same, said stator plates being mounted in the brake assembly in such manner to permit a slight axial movement of one of the plates, and limited axial and rotary movement of the other of the stator plates. The braking action is initiated by axially separating the stator plates or disks to engage the braking surfaces of the respective brake members. This initiation of the braking action may be accomplished by hydraulic, pneumatic, mechanical, or other methods commonly employed, and by conventional pedal control, as desired. On initiation of the braking force, one of the stator plates moves into frictional engagement with its adjacent rotary brake member, thereby causing a limited rotation of this plate relative to the other stator plate, and this relative rotation of the stator plates in turn actuates or energizes the camming members to axially separate or spread the stator plates and frictionally engage the same with the opposed rotary brake members, thereby producing a powerful servo braking action.

My brake, as briefly described above, is unique in many respects, as will hereinafter more fully appear. It may be noted at this point, however, that it is exceedingly simple in design and construction, may be manufactured at low cost, and while it can be light in structure, it is strong and powerful.

Owing to the novel arrangement and construction of the braking parts of the assembly, there is a marked reduction in heat generated when braking application is made under heavy loads and/or for sudden stoppage, which makes the brake especially suited to heavy duty service. The assembly further lends itself to simple and efficient ventilation by the provision of openings or spaces leading from the interior of the assembly to the outer periphery of the rotary brake members, thus permitting the brake to take in and discharge large volumes of air which facilitates the dissipation of heat from all parts of the brake. This circulation of air materially improves the braking action and prolongs the life of the brake and the parts thereof.

Other and further objects and advantages of the invention will be hereinafter described and the novel features thereof defined by the appended claims.

In the drawings:

Figure 1 is a view in side elevation of a brake assembly constructed in accordance with my invention and as adapted for hydraulic brake control, the assembly being shown in this view as applied to a conventional wheel and seen from the inboard side of the assembly, a portion of one of the opposed rotary brake members being broken away to show one of the air spaces or ventilating openings leading from the interior of the assembly to the outer periphery of the rotary members;

Figure 2 is a sectional view taken on the line 2—2 of Figure 1, with the wheel mounting or axle shown in elevation;

Figure 3 is a fragmentary sectional view of a modified form of brake assembly, as particularly constructed and arranged for pneumatic control;

Figure 4 is a fragmentary detail view in side elevation, showing one of the ventilating openings about the periphery of the brake assembly;

Figure 1:
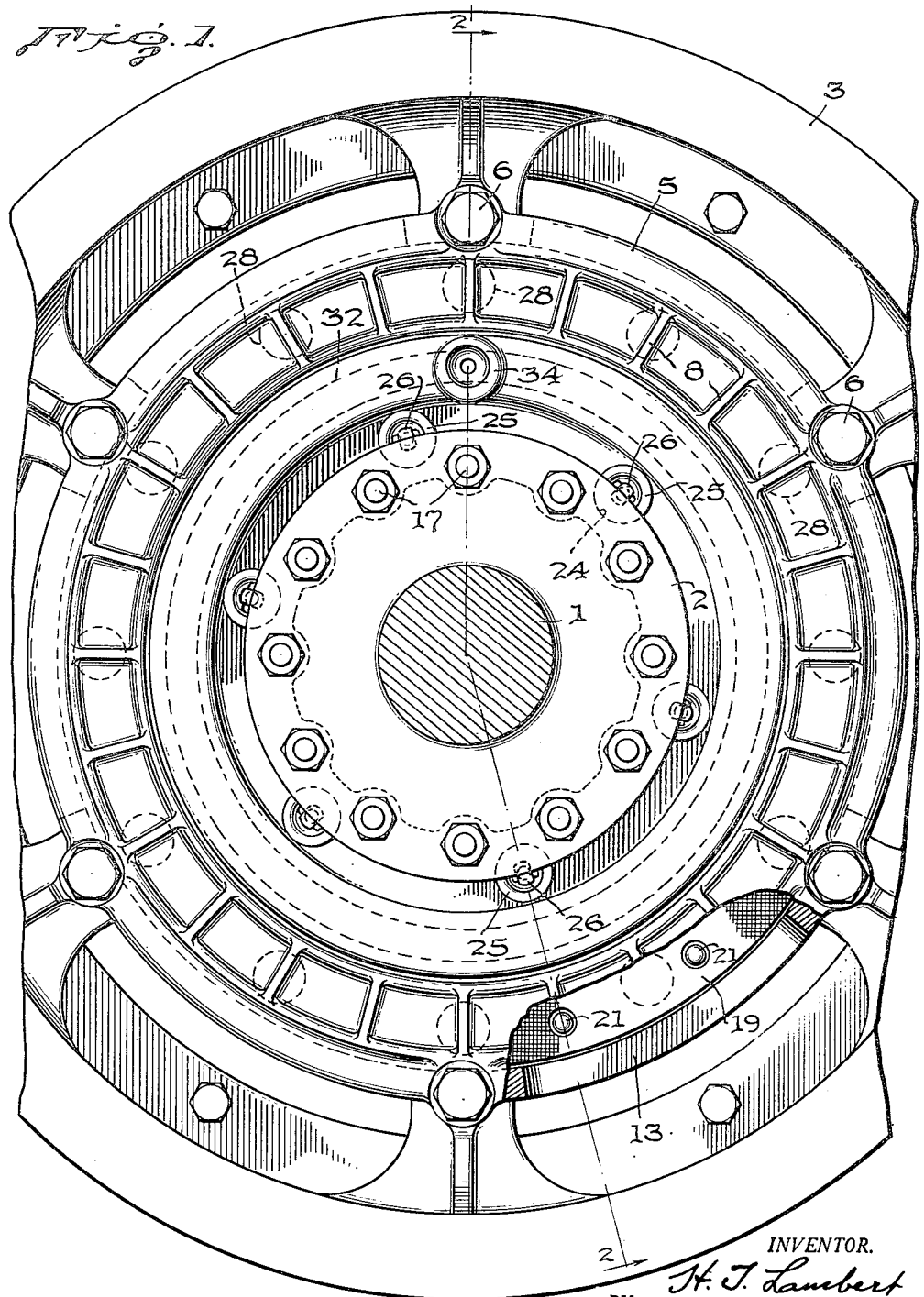

Figure 5 is a detail view in side elevation of a modified form of servo camming unit, consisting of opposed V-grooved inserts and interposed roller, which may be substituted for the spherical ball and conical seat inserts shown in Figures 2 and 3; and Figure 6 is an end elevation of one of the inserts of Figure 5, with the roller shown in broken lines in its inactive position, that is, seated in the base of the groove of the insert.

Like reference characters designate corresponding parts in the several figures of the drawings, wherein 1 denotes a conventional wheel mounting or axle having a stationary flange 2 formed thereon in axially inwardly spaced relation to the outer end of the axle. Rotatably mounted on the axle 1 is a wheel 3 which may be of any conventional design, and which has been shown for illustrative purposes only to represent a part to be braked.

As will be best seen from Figure 2 of the drawings, the brake assembly is preferably mounted at the inboard side of the wheel 3.

Attached to the wheel 3 for rotation therewith is a pair of annular rotary brake members 4, 5. If desired, these rotary brake members may be composed of equal complementary halves, which may be made of cast metal, such as grey iron, or pressed steel, as the circumstances may require. These members 4, 5 are arranged in abutting relation to each other and may be attached to the wheel 3 in any suitable manner, as by means of the long bolts 6 passing through the same near their outer peripheries, and through a part of the wheel. The outer faces of the opposed brake members 4, 5 are preferably provided with radially disposed, circumferentially spaced ribs or fins 7, 8 to stiffen these members, and also to aid in the dissipation of heat generated by the braking action. The inner faces of the members 4, 5 are recessed as at 9 and 10 respectively, so as to provide axially spaced, opposed braking surfaces 11, 12. Between the mounting bolts 6, the abutting faces of the brake members 4, 5 are also recessed to form radially open air spaces or ventilating openings 13 leading from the interior of the brake assembly to the outer periphery of the rotary members 4, 5, said openings or air spaces being located at equally spaced intervals about the brake assembly, as will be best understood by reference to Figure 4 of the drawings.

Disposed between the braking surfaces 11, 12 of the rotary brake members 4, 5 is a second pair of brake members respectively designated 14 and 15, these latter brake members likewise having the form of annular disks or plates. This second-mentioned pair of brake members 14, 15 is fixed relative to the rotary brake members 4, 5, and accordingly may be generally termed as stator plates. One of the stator plates, as for example plate 15, is radially extended inwardly and is provided about its inner edge with a series of equally spaced openings 16, which are to receive the fixed lugs 17 carried by the flange 2 on the axle 1. The lugs 17 are suitably spaced from the flange 2 by a spacing collar 18, and the lugs are axially extended for a distance sufficient to permit a limited axial movement of the stator plate 15 thereon. This axial movement of the stator plate 15 permits engagement and disengagement of the braking surface of the stator plate relative to the braking surface 12 of the rotary brake member 5. Both the stator plate 15 and the stator plate 14 are preferably provided with friction linings 19 and 20 adjacent to their outer peripheries, which linings may be secured to the plates by rivets 21, or in any other suitable manner. It will be understood that the lining 19 on the stator plate 15 cooperates with the braking surface 12 of the rotary brake member 5, and the lining 20 on the stator plate 14 cooperates with the braking surface 11 of the rotary brake member 4.

The stator plate 14 is yieldably connected to and supported by the stator plate 15 to permit a limited relative axial and rotative movement therebetween. This yieldable connection preferably has the form of a series of angularly spaced tie-bolts 22 extended through the stator plates 14 and 15. Surrounding each of the tie-bolts at their respective inboard ends is a helical coil spring 23, one end of the coil spring seating in a well 24 formed in the inboard face of the stator plate 15, and the other end of the spring bearing against a retainer cap or washer 25. The inboard ends of the respective tie-bolts have the form of a flattened T-shaped head 26 which may be passed through a rectangular opening in the washer 25, which opening is narrower in one of its dimensions than the other, so that when the washer has been passed over the T-shaped head 26, a partial turn of the washer about the axis of the tie-bolt establishes an interlock with the tie-bolt. This interlock of the washers 23 with the tie-bolts 22 prevents displacement of the washers from the tie-bolts by the pressure of the springs 23, which, in their assembled condition, are placed under sufficient compression to support the stator plate 14 in a retracted position coaxial with and relatively close to the stator plate 15.

Disposed between the stator plates 14, 15, and located adjacent to their outer peripheries, is a series of camming members. In the form shown in Figure 2 of the drawings, these camming members each comprises a pair of circular inserts 27, 28 respectively mounted in sockets formed in the stator plates 14, 15. The opposed inner face of the respective inserts are provided with conical recesses 29, 30 in which is seated a spherical ball 31. The function of these camming members just described is to axially separate the stator plates 14, 15 responsive to relative rotation between these plates, which relative rotation is produced in a manner hereinafter described.

In lieu of the balls 31 and conical seats 29, 30 in the inserts 27, 28, rollers 31' and inserts 27', 28' respectively provided with V-shaped recesses 29', 30', as shown in Figures 5 and 6, may be substituted therefor, the action of the rollers and V-grooved inserts upon the stator plates 14, 15 being to spread the latter apart, the same as in the case of the balls 31 and conically recessed inserts 27, 28 shown in Figure 2.

Formed in the outboard face of the stator plate 15 is an annular groove or channel 32 having communication through a passage 33 with a fluid inlet boss 34, which may be connected with a conventional hydraulic pressure system. Disposed in the channel 32 next to the passage 33 is a pressure seal 35, at the outer side of which is disposed an annular insulating ring 36 which also serves as a pilot or bearing ring for the stator plate 14 which is recessed at 37 to receive the outer end of the ring 36.

In the operation of the brake assembly, as illustrated in Figures 1 and 2 of the drawings, the application of pressure of the hydraulic pressure fluid, which may be controlled by a conventional pedal control and master cylinder (not shown), causes the fluid seal 35 and insulating ring 36 to move outwardly in the annular channel 32, thereby displacing the stator plate 14 towards the rotary brake member 4. As the friction lining 20 engages the braking surface 11, a drag is imposed upon the stator plate 14 by the rotation of the brake member 4 with the wheel 3. This drag causes a limited rotation of the stator plate 14 relative to the stator plate 15, which in turn causes the balls 31 or rollers 31', as the case may be, to roll up the inclined surfaces of their seats and thereby axially separate the stator plates 14 and 15 against the yielding pressure of the springs 23. In allowing such separation of the stator plates, the stator plate 15 is free to move axially on the studs 17. This separation of the stator plates forcibly urges both friction linings 20 and 19 into engagement with the braking surfaces 11 and 12 respectively of the rotary brake members 4, 5, thereby producing a powerful servo braking action upon the wheel 3 which is initiated by the initial application of pressure of the hydraulic pressure fluid.

Upon release of the pressure of the hydraulic pressure fluid, the springs 23 retract the stator plates 14, 15 towards each other, under which condition the balls will automatically restore the stator plate 14 to a position of axial alinement of the opposed inserts 27, 28, with the balls assuming a position at the bottom of the recesses 29, 30.

It should be understood that the rotary brake members 4, 5, should be mounted at the time of their application to the wheel 3 so as to allow for such movements of the stator plates 14, 15 as may be necessary for proper braking action and complete disengagement of the friction linings 19, 20 from the braking surfaces 12, 11 on release of the brake. The clearances thus provided will also serve the purpose of relieving any pressure upon the wheel bearings. Likewise, the stator plates 14, 15 should be mounted on the flange bolts or studs 17 with the proper clearance to allow for movement of the stator plates to and from their braking positions. These clearances will be modified according to the size of the brake and with the different spacings necessarily provided for various adaptations of the brake in its different uses.

By reason of the provision of the ventilating openings 13 located about the brake assembly and leading from the interior of the rotary brake members 4, 5 to the outer periphery thereof, unusually large volumes of air will be drawn into and discharged from the brake, thus serving to reduce the heat generated by friction and to dissipate the heat from all parts of the brake.

By reason of the simplicity of the construction and operation of the brake mechanism, I have been able to substantially eliminate friction in the brake applying means, which friction has heretofore been inherent in virtually all types of brakes, to the detriment of the braking action and control thereof.

Referring now to the modification illustrated in Figure 3, it will be seen that the construction is generally similar to that shown in Figure 2, excepting that the parts have been modified somewhat to adapt the same to pneumatic control. As shown, the assembly includes a pair of complemental opposed rotary brake members 41, 42, which are attached to the wheel 3 by means of the through bolts 43. These brake members are provided with opposed braking surfaces 44, 45 for cooperation with the friction linings 46. 47 respectively secured to the stator plates 48 and 49, which are disposed between the rotary brake members 41, 42 and are substantially enclosed by the latter. The stator plate 48 is yieldably connected to the stator plate 49 by a series of tie-bolts 50, each having a coil spring 51 seating in a well 52 formed in the inboard face of the stator plate 49. The opposite ends of the springs 51 bear against a retainer cap or washer 53 which is interlocked with the tie-bolt 50 and abuts against the flattened T-shaped head 54. It will be understood that the stator plate 49 is adapted to be mounted on the flange bolts or studs 17 carried by the flange 2 on the wheel axle 1, said stator plate 49 being free to move axially on said studs. The stator plate 48 is preferably provided with a shoulder 55 engaging about an axially extended shoulder 56 on the stator plate 49, thereby maintaining a perfect concentric relation between the two stator plates, while permitting a limited axial and rotative movement relative to each other. The stator plates are each respectively provided with a series of inserts 57 and 58 disposed in opposed relation to each other and having balls or rollers, whichever is preferred, disposed therebetween. As shown in Figure 3, the inserts 57 and 58 are illustrated in the form intended for coaction with balls 59, corresponding to the inserts and balls shown in Figure 2.

Application of the brake by means of pneumatic pressure control may be accomplished by providing the stator plate 49 with an inlet boss 60 adapted to be connected to any conventional pneumatic system (not shown). Leading from the inlet boss 60 is a passage 61 which communicates with a pressure space 62 lying between the stator plates 48 and 49. Suitable seals, such as the metal seals 63 and 64, are provided to prevent the loss of fluid pressure from the pressure space 62 at the points where the stator plates 48 and 49 have a sliding fit one with the other. In this connection, it may be noted that the outer periphery of the stator plate 48 is axially extended at 65 to overlie the outer periphery of the stator plate 49.

The operation of the brake construction shown in Figure 3 will be obvious from the foregoing description, being similar to that previously described in connection with the other figures of the drawings, and therefore need not be repeated.

While the specific details have been herein shown and described, the invention is not confined thereto as changes and alterations may be made without departing from the spirit thereof as defined by the appended claims.

I claim:

1. The combination with a rotatable member to be braked and fixed mounting means for said rotatable member, of a pair of complemental brake members having opposed axially spaced braking surfaces lying respectively in planes normal to the axis of rotation of the member to be braked, said brake members having provision for attaching the same in contiguous relation to each other to the member to be braked and so as to be rotatable therewith, a pair of relatively fixed, contiguously arranged stator plates disposed between the braking surfaces aforesaid and having corresponding braking surfaces on opposite sides thereof engageable with the braking surfaces on the adjacent brake members on axial separation of the stator plates, one of said stator plates being supported by the fixed mounting means for the member to be braked and being axially movable relative to the aforementioned brake members, the other of said stator plates being yieldably connected to and coaxially supported by the first-mentioned stator plate for angular and axial movement relative thereto, servo-cam means including a free rolling element interposed between the stator plates and operable on initial engagement of the second-mentioned stator plate with the braking surface of its adjacent brake member, to axially separate the stator plates, whereby to produce a braking action upon both brake members, and consequently upon the rotatable member to be braked, and fluid-pressure means acting upon the angularly and axially movable stator plate, uniformly about the axis of the same, for applying an initial axial thrust to the latter stator plate to engage the same with its adjacent brake member, said first-mentioned brake members having the form of abutting annular disks, and the braking surfaces thereof being respectively recessed in their contiguous faces to a point inwardly spaced from their abutting outer margins, thereby defining a space between the braking surfaces to receive the stator plates therebetween, with the stator plates substantially enclosed at their peripheries by the outer margins of the brake members, and the outer margins of the brake members being provided with complemental, opposed recesses at intervals about the same, said recesses defining radially open ventilating spaces between the brake members in the plane of abutment of the brake members.

2. The combination with a rotatable member to be braked and fixed mounting means for said rotatable member, of a pair of complemental brake members having opposed axially spaced braking surfaces lying respectively in planes normal to the axis of rotation of the member to be braked, said brake members having provision for attaching the same in contiguous relation to each other to the member to be braked and so as to be rotatable therewith, a pair of relatively fixed, contiguously arranged stator plates disposed between the braking surfaces aforesaid and having corresponding braking surfaces on opposite sides thereof engageable with the braking surfaces on the adjacent brake members on axial separation of the stator plates, one of said stator plates being supported by the fixed mounting means for the member to be braked and being axially movable relative to the aforementioned brake members, the other of said stator plates being yieldably connected to and coaxially supported by the first-mentioned stator plate for angular and axial movement relative thereto, servo-cam means including a free rolling element interposed between the stator plates and operable on initial engagement of the second-mentioned stator plate with the braking surface of its adjacent brake member, to axially separate the stator plates, whereby to produce a braking action upon both brake members, and consequently upon the rotatable member to be braked, and fluid-pressure means acting upon the angularly and axially movable stator plate, uniformly about the axis of the same, for applying an initial axial thrust to the latter stator plate to engage the same with its adjacent brake member, said stator plate which is supported by the fixed mounting means for the rotatable member to be braked, being provided with an annular pressure fluid channel facing the other stator plate and having means for admitting a pressure fluid into the channel, and an annular thrust ring axially movable in said channel for imparting an initial axial movement to the latter stator plate towards the braking surface of its adjacent brake member responsive to the fluid pressure in said channel, whereby to initiate operation of the servo cam means.

3. In a brake mechanism, a pair of annular brake members of complementary duplicate form arranged in abutting relation and defining an outer housing provided with axially spaced opposed braking surfaces, a second pair of relatively axially movable brake members arranged within the housing and each having a braking surface for cooperative frictional engagement with one of the braking surfaces on the outer housing, said latter brake members being coaxially supported one by the other and defining a chamber therebetween and being relatively rotatable with respect to the first pair of brake members, means for admitting a pressure fluid medium into the chamber aforesaid to create relatively reactive axial thrusts upon the last-mentioned brake members to produce frictional engagement of the braking surfaces aforesaid, and servo-cam means disposed intermediate the axially movable brake members and operable on frictional engagement of the braking surfaces to produce a servo-braking action.

4. In a brake mechanism, a pair of annular brake members arranged in abutting relation and defining an outer housing provided with axially spaced opposed braking surfaces, a second pair of relatively axially movable annular brake members arranged within the housing and each having a braking surface for cooperative frictional engagement with one of the braking surfaces on the outer housing, one of said axially movable brake members being axially extended about its outer margin for sliding telescopic engagement with the other axially movable brake member, and the other axially movable brake member being axially extended about its inner margin for sliding telescopic engagement with the aforementioned axially movable brake member, said latter brake members defining a chamber therebetween and being relatively rotatable with respect to the first pair of brake members, means for admitting a pressure fluid medium into the chamber aforesaid to create relatively reactive axial thrusts upon the last-mentioned brake members to produce frictional engagement of the braking surfaces aforesaid, and pressure sealing means disposed within the pressure chamber and having sealing engagement with the respective brake members at their outer and inner telescopically engageable margins to prevent the escape of the pressure fluid medium from the pressure chamber.

5. In a brake mechanism, a pair of brake members arranging in abutting relation and defining an outer housing provided with axially spaced opposed braking surfaces, a second pair of relatively axially movable brake members arranged within the housing and each having a braking surface for cooperative frictional engagement with one of the braking surfaces on the outer housing, said latter brake members defining a chamber therebetween and being relatively rotatable with respect to the first pair of brake members, means for admitting a pressure fluid medium into the chamber aforesaid to create relatively reactive axial thrusts upon the last-mentioned brake members to produce frictional engagement of the braking surfaces aforesaid, and servo cam means disposed between the second-mentioned brake members and located in the pressure chamber, said servo-cam means including a plurality of equidistantly spaced inserts having oppositely inclined camming surfaces mounted in the respective second-mentioned brake members and arranged in opposed relation to each other, and a freely rolling member disposed between each pair of opposed cam inserts and engaging the camming surfaces thereof.

HOMER T. LAMBERT.